(12) United States Patent
Bako et al.

(10) Patent No.: US 9,852,498 B2
(45) Date of Patent: Dec. 26, 2017

(54) REMOVING ARTIFACTS FROM DOCUMENT IMAGES

(71) Applicant: Adobe Systems Incorporated, San Jose, CA (US)

(72) Inventors: Steve Christopher Bako, Goleta, CA (US); Aliakbar Darabi, Seattle, WA (US); Jue Wang, Kenmore, WA (US); Elya Shechtman, Seattle, WA (US); Kalyan K. Sunkavalli, San Jose, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 4 days.

(21) Appl. No.: 15/139,163

(22) Filed: Apr. 26, 2016

(65) Prior Publication Data

US 2017/0309003 A1    Oct. 26, 2017

(51) Int. Cl.

| | |
|---|---|
| G06K 9/40 | (2006.01) |
| G09G 5/00 | (2006.01) |
| G06T 5/00 | (2006.01) |
| G06T 7/40 | (2017.01) |
| G06K 9/18 | (2006.01) |
| G06K 9/46 | (2006.01) |

(52) U.S. Cl.
CPC ............ G06T 5/008 (2013.01); G06K 9/18 (2013.01); G06K 9/40 (2013.01); G06K 9/4647 (2013.01); G06K 9/4652 (2013.01); G06T 7/408 (2013.01); G06T 2207/10008 (2013.01); G06T 2207/10024 (2013.01); G06T 2207/20072 (2013.01); G06T 2207/20208 (2013.01); G06T 2207/30176 (2013.01)

(58) Field of Classification Search
CPC .......... G06K 9/4647; G06K 9/40; G06K 9/18; G06K 9/4652; G06T 2207/10024; G06T 2207/10008; G06T 2207/20208; G06T 2207/30176; G06T 2207/20072
USPC ....... 382/164, 168, 173, 176, 181, 190, 284, 382/199, 195, 180, 125, 128, 165, 167, 382/254, 275; 345/649, 582, 589
See application file for complete search history.

(56) References Cited

U.S. PATENT DOCUMENTS

| | | | |
|---|---|---|---|
| 7,046,260 B2 * | 5/2006 | Frimout | G11B 27/034 345/629 |
| 8,155,442 B2 * | 4/2012 | Ma | G06K 9/38 382/169 |
| 8,457,415 B1 * | 6/2013 | Wang | G06K 9/72 382/103 |
| 8,588,548 B2 * | 11/2013 | Krolczyk | G06T 11/60 382/190 |

* cited by examiner

Primary Examiner — Sheela C Chawan
(74) Attorney, Agent, or Firm — Wolfe-SBMC

(57) ABSTRACT

Techniques for removing artifacts, such as shadows, from document images are described. A shadow map is generated for a digital image by first determining local background colors using clusters of local pixel intensities. Then, a global reference background color is selected from all pixel intensities of the digital image. Next, a per-pixel scaling factor is determined that maps the local background colors to the global reference background color, which applies localized adjustment to the digital image to remove local shadow.

20 Claims, 6 Drawing Sheets

REMOVING ARTIFACTS FROM DOCUMENT IMAGES

BACKGROUND

Despite the increasing availability of computing technology in all aspects of life, paper documents are still prevalent in many scenarios. In some cases, users wish to create digital images from paper documents. For example, digital images of documents, receipts, menus, books, newspapers, flyers, and other text are frequently captured to distribute information to other users, or for use in applications such as optical character recognition (OCR). Oftentimes, these digital images often contain distracting artifacts from the photographer, the camera, or other objects in the environment. Distracting artifacts can be aesthetically unpleasing, and can cause issues for applications involving OCR.

SUMMARY

Techniques to remove artifacts from document images are described. In one or more implementations, a digital image is accessed via a digital image editing environment. A shadow map is calculated to match local background colors of the digital image to a global reference background color. The shadow map is calculated by determining local background colors of blocks of the digital image by clustering pixel intensities into two or more clusters for each block of the digital image. Next, pixel intensities of the entire digital image are clustered into two or more clusters, and global background colors are determined based on the two or more clusters representing the entire digital image. A background color of the digital image is assigned as the global reference background color based on the determined global background colors. The local background colors are then normalized by the global reference background color to generate a per-pixel scaling factor that maps the local background colors of the digital image to the global reference background color. Localized adjustment is applied to pixels of the digital image to remove local artifacts from the digital image using the per-pixel scaling factor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
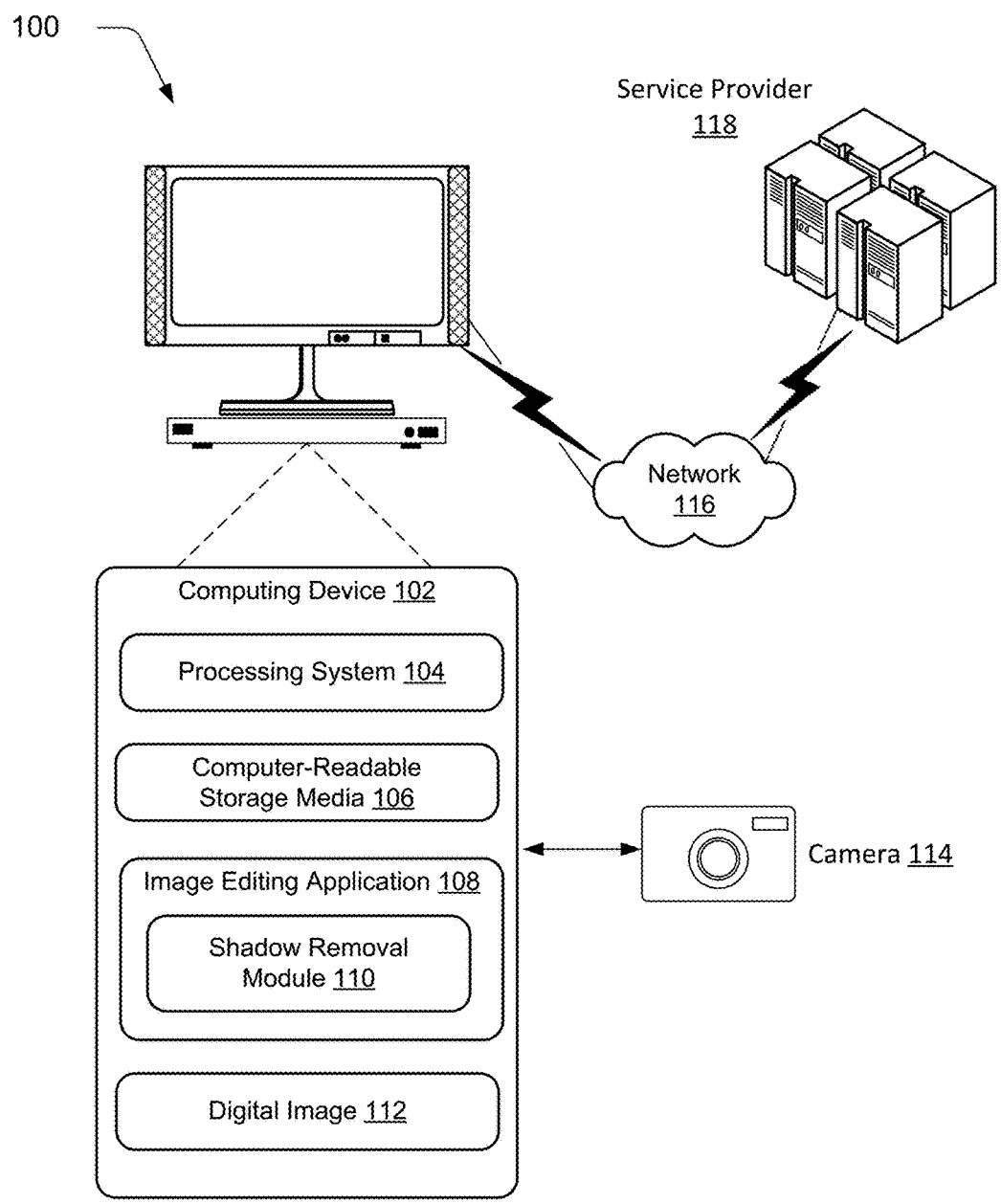
FIG. 1 illustrates an example operating environment in accordance with one or more implementations.

Techniques described herein provide solutions to problems faced by users as part of creating and perfecting digital images. In one implementation, the described techniques access a digital image that has been generated from a paper document. As discussed above, paper documents can be hard copy documents, receipts, menus, books, newspapers, or flyers, to name a few. Digital images may also capture other mediums, such as a whiteboard or chalkboard, to name a few examples. The digital image of the paper document, or other medium, may include an undesired artifact. Undesired artifacts can be the result of occlusion of light when capturing a digital image of a paper document, causing a shadow to appear in the digital image. Other undesired artifacts are also contemplated, including but not limited to blooming, chromatic aberration, color cast, lens flare, mottle, sensitivity, and sensor dust, to name some examples. These undesired artifacts can cause significant difficulties with subsequent image processing techniques and applications. For example, optical character recognition (OCR) applications are used for data entry, language translation, and conversion of printed documents to searchable text. OCR involves conversion of images of typed, handwritten, or printed text into machine-encoded text. The undesired artifacts can make digital images of paper documents harder to parse, and can make OCR less accurate.

Paper documents often have a constant background color, usually the color of the paper. Taking this into consideration, the techniques described herein enforce a consistent background color to produce an output digital image with reduced effects of undesired artifacts, such as shadow. In one or more implementations, a digital image of a paper document is divided into multiple local blocks. Then, text and background colors are estimated for each of the local blocks of the digital image. Text colors generally relate to text or images that are printed on or otherwise displayed as part of the original paper document. Background colors refer to colors of the area behind or surrounding the object of contemplation, where the object of contemplation is text or an image in the original paper document. Background colors encompass the color of the paper of a paper document, but also may include colors resulting from undesired artifacts in a digital image of the paper document.

When the text and background colors are determined for each of the local blocks of the digital image, text and background colors are determined for the entire digital image as a whole. A representative color of all of the background colors of the digital image is selected as a global reference background color. In order to obtain a constant background color and reduce the effects of undesired artifacts, a scaling factor is applied at each pixel of the digital image using a shadow map. The shadow map matches the background colors of the local blocks to the global reference background color, using the per-pixel scaling factor. This generates a uniform color for the background of the digital image, removing undesired artifacts such as shadows from the background of the digital image while maintaining the integrity of the text colors of the original paper document.

In the discussion that follows, a section titled "Operating Environment" is provided that describes one example environment in which one or more implementations can be employed. Next, a section titled "Removing artifacts from Document Images" describes example details and procedures in accordance with one or more implementations. Last, a section titled "Example System" describes example computing systems, components, and devices that can be utilized for one or more implementations of removing artifacts from document images.

Operating Environment

FIG. 1 illustrates an operating environment generally at 100 in accordance with one or more implementations for removing artifacts from document images. The environment includes a computing device 102 having a processing system 104 with one or more processors and devices (e.g., CPUs, GPUs, microcontrollers, hardware elements, fixed logic devices, etc.), and one or more computer-readable media 106. The environment also includes an image editing application 108 and a shadow removal module 110 that reside on the computer-readable media and that are executable by the processing system. Examples of computer-readable media can be found in the discussion of the example computing system of FIG. 6.

The processing system 104 may retrieve and execute computer-program instructions from the image editing application 108 and the shadow removal module 110, and other applications of the computing device (not pictured) to provide a wide range of functionality to the computing device 102, including but not limited to gaming, office productivity, email, media management, printing, networking, web-browsing, and so forth. A variety of data and program files related to the applications can also be included, examples of which include games files, office documents, multimedia files, emails, data files, web pages, user profile and/or preference data, and so forth.

A camera 114 is shown as being communicatively coupled to the computing device 102. The camera 114 may be configured as a photographic camera, a video camera, or both. The camera 114 may be configured as a standalone camera, such as a compact camera, action camera, bridge camera, mirrorless interchangeable-lens camera, modular camera, digital single-lens reflex (DSLR) camera, digital single-lens translucent (DSLT) camera, camcorder, professional video camera, panoramic video accessory, or webcam, to name a few. Additionally or alternatively, the camera 114 may be integrated into the computing device 102, such as in the case of built-in cameras in mobile phones, tablets, PDAs, laptop computers, and desktop computer monitors, for example. Additionally or alternatively, the computing device 102 may itself be a camera, for example a "smart" digital camera, and may comprise one or more of the processing system 104, computer-readable storage media 106, image editing application 108, and shadow removal module 110. Other embodiments of the structures of the computing device 102 and the camera 114 are also contemplated.

The computing device 102 may be configured to obtain resources from a service provider 118 via a network 116. The service provider 118 enables the computing device 102 and the camera 114 to access and interact with various resources made available by the service provider 118.

The resources made available by the service provider 118 can include any suitable combination of content and/or services typically made available over a network 116 by one or more service providers. For instance, content can include various combinations of text, video, ads, audio, multi-media streams, applications, animations, digital images, webpages, and the like. Content may also comprise digital images of paper documents, examples of which are provided above and below. The computing device may be configured to communicate with the camera 114 and/or the service provider 118 via the network 116 through one or more of a cellular network, a PC serial port, a USB port, and wireless connections such as Bluetooth or Wi-Fi, to name a few.

The computing device 102 may also include an image editing application 108 and a shadow removal module 110 that operate as described above and below. The image editing application 108 and the shadow removal module 110 may be provided using any suitable combination of hardware, software, firmware, and/or logic devices. The image editing application 108 represents functionality operable to create and/or edit digital images. For instance, image editing application may be configured as a raster graphics editor capable of composing and editing raster images in multiple layers, edit and render text, edit digital documents using vector graphics, display and edit three-dimensional graphics, and edit videos, to name a few examples. Alternatively or additionally, the image editing application 108 may comprise part of one or more other applications, such as word processing applications, media presentation applications, social networking applications, applications to manage business accounts, banking applications, and applications configured to interact with scanners, copiers, and fax machines, to name some examples. The image editing application 108 may also be configured to implement functionality associated with OCR, as discussed above and below.

The shadow removal module 110 represents functionality operable to automatically detect and remove shadows or other undesired artifacts from digital images, such as digital image 112. This may include removing undesired artifacts from digital images of paper documents that were accessed from the camera 114, or from the service provider 118, for example. The shadow removal module 110 may be configured to estimate the colors of background and graphics in local image blocks. Graphics may include text, images, shapes, and/or borders, or any other graphic that may be printed on or otherwise part of a paper document. While provided examples relate generally to text as part of a paper document, the techniques described herein may be applied to any graphic that is printed on or otherwise part of the paper document or document implemented using any other physical medium. The shadow removal module 110 matches local background color estimates to a global reference color to generate a shadow map. The shadow removal module 110 then corrects the digital image using the shadow map to produce an output with reduced effects of shadow or other undesired artifacts. Details regarding these and other aspects of removing artifacts from document images are discussed in the following sections.

Having described an example operating environment, consider now example details and techniques associated with one or more implementations of removing artifacts from document images.

Removing Artifacts from Document Images

Consider the discussion in this section of example devices, components, procedures, and implementation details that may be utilized to remove shadows from document images as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
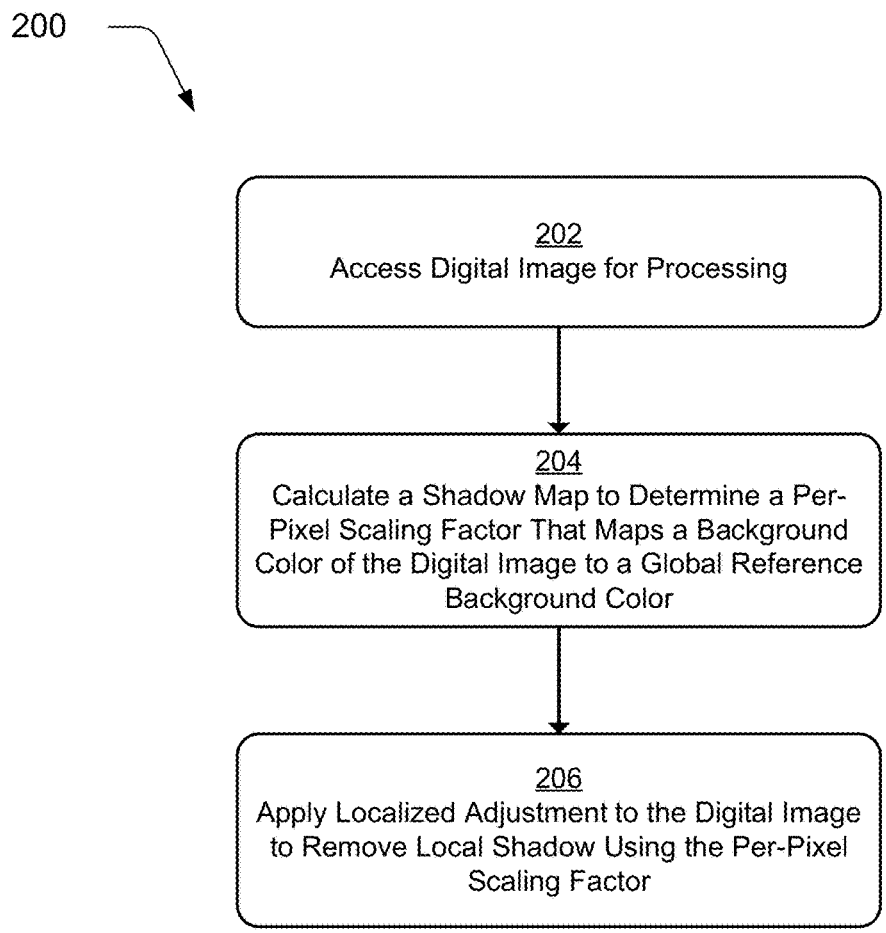
FIG. 2 is a flow diagram that describes details of an example procedure for removing artifacts from document images in accordance with one or more implementations.

FIG. 2 depicts generally at 200 a flow diagram for an example procedure in which shadows are removed from document images. The procedure depicted in FIG. 2 can be implemented by way of a suitably configured computing device, such as by way of the image editing application 108 and the shadow removal module 110, and/or other functionality described in relation to the examples of FIGS. 1, 3, 4 and/or 6. Individual operations and details discussed in relation to FIG. 2 may also be combined in various ways with operations and details discussed herein in relation to the example procedure of FIG. 5.

A digital image is accessed for processing (block 202). The digital image may be of a paper document, as discussed above, or document captured on any other physical medium. Digital images may be accessed in a number of ways, examples of which are also provided above. For example, a digital image of a paper document may be captured by a camera that is communicatively coupled to a computing device. Another example involves capturing the digital image of the paper document using a camera that is integrated with the computing device, such as a smartphone camera. Yet another example involves obtaining the digital image from a remote service to display on the computing devices, such as from a service provider via a network. Further examples include obtaining a digital image from a scanner, copier, or facsimile machine. Other examples of accessing digital images are also contemplated, such as transferring digital images to a device via a flash drive, hard drive, optical disk, or other media, downloading images from cloud based storage, and so forth.

A shadow map is calculated to determine a per-pixel scaling factor that maps a background color of the digital image to a global reference background color (block 204). In order to achieve an overall consistent background color, text and background colors are estimated in local blocks of the digital image. The digital image can be divided into any number of suitable local blocks. In each of the local blocks, pixel intensities are clustered into multiple clusters using, for example, Gaussian Mixture Models (GMMs). In one implementation, one of the multiple clusters contains intensities from the background of the paper document, and another cluster contains intensities from colors of the text of the paper document. While two clusters are described herein, any suitable number of color intensities may be used to form representative clusters, examples of which are provided below.

In one or more implementations, it is assumed that the cluster with the higher mean corresponds to the background color intensity of the local block. This assumption is based on paper documents having dark colored text on a bright background. However, this assumption is readily reversed for scenarios involving paper documents having a dark colored background with bright text, resulting in a lower cluster mean corresponding to the background intensity of the local block. When the local background colors of each block are determined, a current shadow map is upsampled by the block size, such as by using a Lanczos filter. This generates the local background intensities at every pixel of the document.

To calculate the shadow map, an assumption may be made that a paper document from which the digital image is derived has an overall consistent background color. Therefore, the resulting digital image of the paper document has this property as well. A global reference background color is determined by clustering the text color and background color for all pixels in the entire digital image. Alternatively or additionally, multiple of the local blocks can be used to determine a global reference background color. In the example described above where the paper document contains dark text on a relatively brighter background, the higher mean cluster is labeled as the background. To obtain the global reference background color, all intensities in the original digital image are searched to find the closest intensity to the cluster mean of the higher cluster. The shadow map is generated by normalizing the background intensities of the local blocks by the global reference using a per-pixel scaling factor. A per-pixel scaling factor is representative of the difference in color of each pixel of the digital image from the global reference background color. This localized adjustment is applied to the digital image to remove local shadow using the per-pixel scaling factor (block 206).

Figure 3:
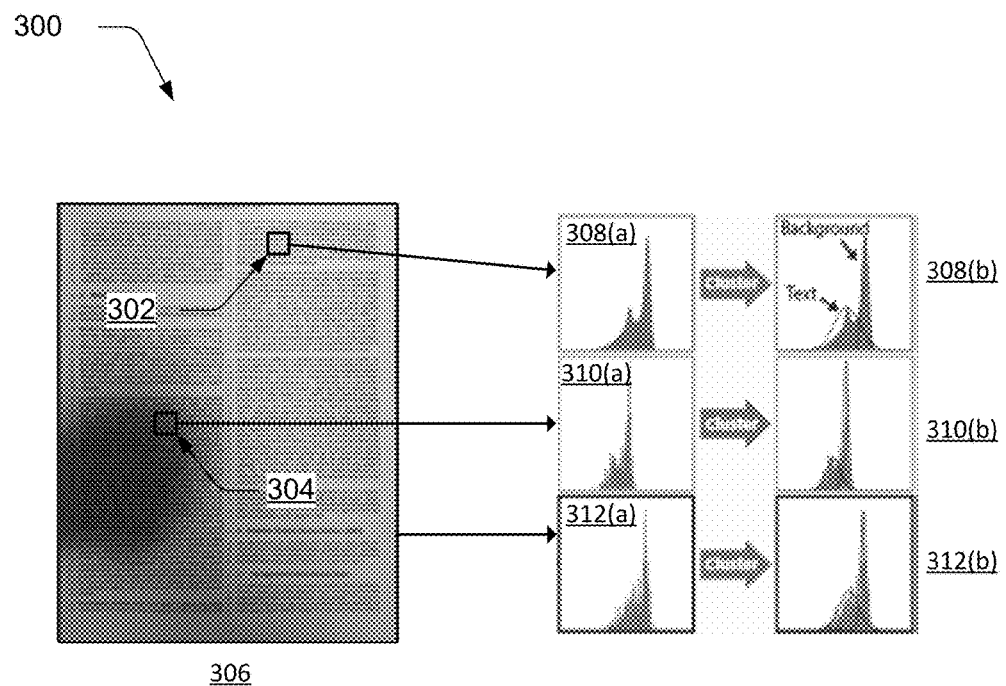
FIG. 3 is a diagram depicting example clusters calculated from a digital image in accordance with one or more implementations.

Turning now to FIG. 3, a representation of generating color intensity clusters from a digital image of a paper document is depicted generally at 300. The digital image has been divided into multiple local blocks, such as blocks 302 and 304. While only two blocks are pictured, one skilled in the art will realize that any suitable number of blocks can be used. In one or more implementations, the local blocks may overlap one another. Alternatively or additionally, the local blocks may contact each other without overlapping, or may be entirely separated by unanalyzed space of the digital document. A histogram is generated for each local block 302, 304 that represents the pixel intensity values found in each respective local block, for example histograms 308(*a*) and 310(*a*). The illustrated histograms 308(*a*) and 310(*a*) represent color intensity values on the horizontal axis and the number of pixels of the particular intensity on the vertical axis. The color intensities along the horizontal axis may be representative of colors in an RGB spectrum, a grayscale spectrum, or any other color spectrum appropriate for generating a color intensity histogram.

For each of the histograms 308(*a*) and 310(*a*), the pixel intensities are assigned to multiple clusters. In one implementation, the pixel intensities are clustered into two clusters that represent the color intensity of the background and the color intensity of the text, as shown by histograms 308(*b*) and 310(*b*), corresponding to histograms 308(*a*) and 310(*a*) accordingly. In such an example, clustering of the color intensities of the histograms 308(*a*) and 310(*a*) can be performed by using GMMs fit with Expectation-Maximization (EM) and initialized with k-means clustering. Other clustering techniques are also contemplated, such as techniques associated with hierarchical clustering, distribution-based clustering, and density-based clustering, to name a few examples. Further, the clustering may be fit by other means, such as moment-based approaches, for example.

Based on the assumption that paper documents typically have dark colored text on a relatively brighter background, a cluster center is assigned to the cluster with the higher mean color intensity, and determined to be the background color. As seen in 308(*b*), the cluster with the higher color intensity value along the horizontal axis of the histogram (representing color intensity) is labeled as the background color. Again, while the example provided herein describes assigning a background color to the higher color intensity value, this may be altered in any suitable way in order to accurately remove undesired artifacts from digital images. For instance, a user may assign a particular color as the background color for the digital image, regardless of the background color's intensity value. This may be especially useful in situations where there are three or more colors in the original paper document, or there are two or more background colors in the original paper document, leading to multiple color intensity clusters being formed. Additionally, in one or more implementations, the cluster with the lower mean cluster intensity is assigned to represent text or graphics that are printed on or otherwise part of the paper document in the digital image. Determination of a cluster center can be performed for each of the local blocks of the digital image, or may be performed for a subset of the local blocks of the digital image in one or more implementations.

When the background colors have been determined for the local blocks, the system then determines a global reference background color. In one or more implementations, pixel intensities are determined for the entire digital image 306. Alternatively or additionally, a region not encompassing the entire digital image may be used, where the region incorporates multiple local blocks. Similar to the discussion above regarding the local blocks, a histogram 312(a) of color intensities is generated for the entire digital image 306. In a scenario where a region is used that incorporates multiple blocks, an aggregate histogram is generated of color intensities representative of the region as a whole. Then, the pixel intensities represented in the histogram 312(a) are clustered into multiple clusters, represented by 312(b), for the entire digital image 306. Examples of clustering techniques are provided above. In this example, two clusters are depicted in 312(b) representing the background color and the color of the text; however, other embodiments are contemplated which provide clusters for alternate elements of the paper document.

Next, a cluster center is assigned to the cluster of 312(b) with the higher mean cluster intensity and determined to be the background color. This is again based on the assumption that paper documents typically have dark colored text on bright background in this example, although other implementations are also contemplated as described above. Additionally, in one or more implementations, the cluster with the lower mean cluster intensity is assigned to represent text or graphics that are printed on or otherwise part of the paper document in the digital image. The system compares a cluster mean of the higher mean cluster intensity of the entire digital image to all of the color intensities of the entire digital image. The cluster mean is representative of a color intensity of the background of the original paper document. Then, the color intensity of all color intensities that is closest to the mean intensity of the higher mean cluster of the entire digital image is assigned as the global reference background color.

Other techniques are also contemplated in order to determine a global reference background color. For instance, instead of clustering color intensities for the entire digital image, the system may use the local clusters that were previously calculated. For example, local blocks having the largest local background intensities can be used to determine the global reference background color by averaging the color intensities of the background colors of these particular local blocks. The largest local background intensities may be determined by the number of points in the background color cluster of the histogram for each local block, for example. This technique could take into account color intensities throughout the digital image and be more robust against outlier color intensities.

Alternatively or additionally, the global reference background color could be selected based on another color representative of the background of the paper document, such as a color that occurs most frequently (e.g., the mode of the color intensities) in the digital image. This may be especially useful in paper documents where the background color occurs more frequently than any other color. In another example, a standard deviation is calculated for the clusters, and any color intensities outside of a determined number of deviations may be disregarded when determining the global reference background color, such as by the techniques described above. Other ways of determining a global reference background color are also contemplated.

Figure 4:
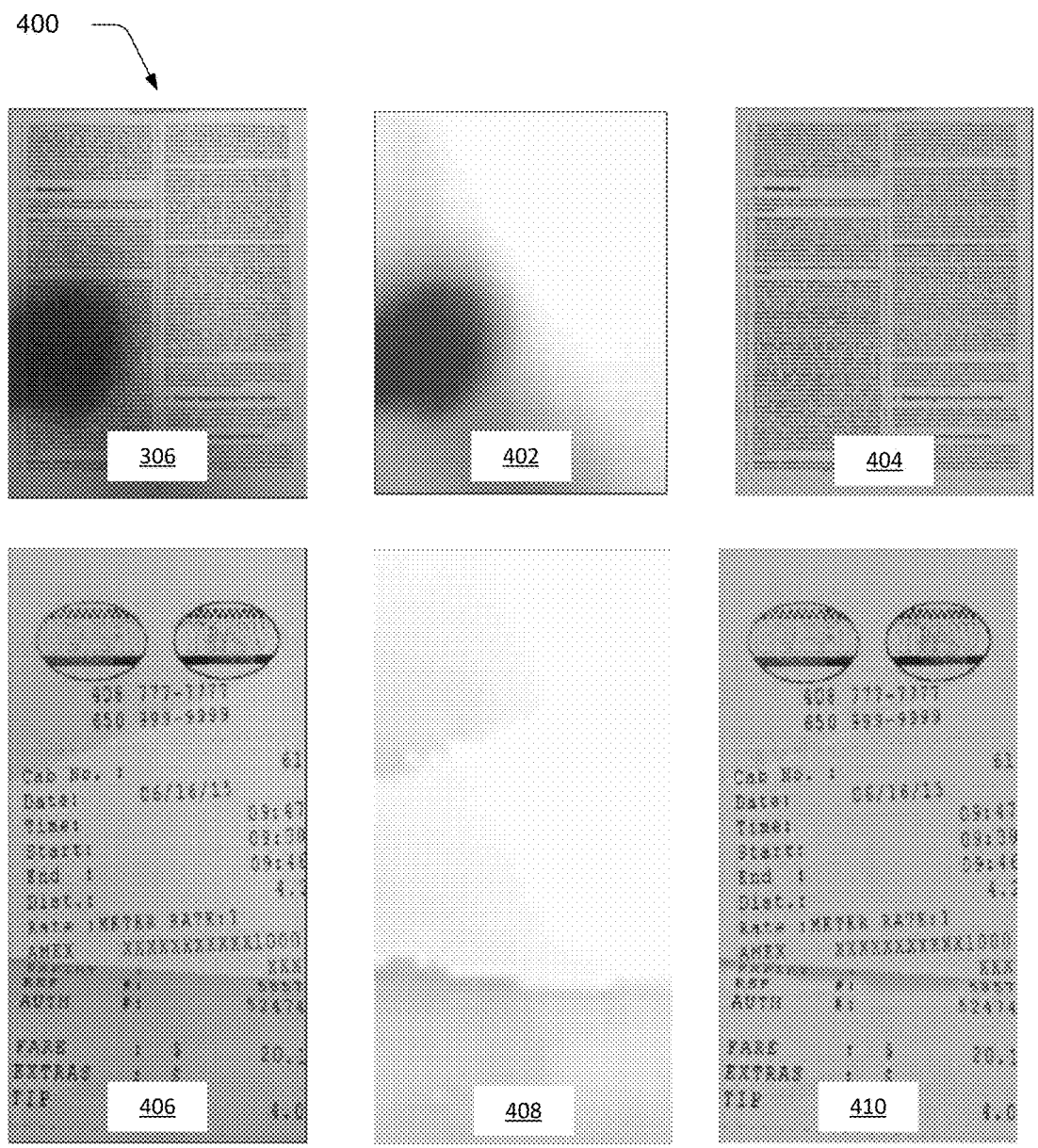
FIG. 4 is a diagram depicting example shadow maps calculated from digital images in accordance with one or more implementations.

Turning now to FIG. 4, examples of computing a shadow map for a digital image of a paper document are depicted generally at 400. The global reference background color determined in association with FIG. 3 is expected to be representative of the true background color of the original paper document. However, local background colors of digital images of paper documents can deviate from the true background color because of illumination effects and undesired artifacts, as discussed above. In order to remove these undesired artifacts and illumination effects, a shadow map is generated using the ratio of the local background colors for the multiple blocks and global reference background color, which were determined in relation to FIG. 3. This ratio may be represented by the following Equation 1:

$$\alpha_i = \frac{l_i}{g}$$

Where $l_i$ is the local background intensity at pixel i and g is the global reference background color for all of the pixels. Applying Equation 1 to the clusters of each local block identified as the background color for the respective block results in a shadow map of where undesired artifacts exist in the digital image of the paper document.

To further illustrate, a shadow map 402 is calculated for the digital image 306 described in relation to FIG. 3 using Equation 1. The techniques described herein accurately detect regions of shadow in the digital image 306 by comparing the global reference background color to the background determined for each local block. In an implementation, the global reference background color is compared to the local background colors by Equation 1 (e.g., solely), leaving the text and graphics of the original paper document untouched and preserved.

The shadow map 402 is then applied to the original input digital image 306 to produce a final, de-shadowed resulting digital image 404. Particularly, the factor $\alpha_i$ computed in Equation 1 to form the shadow map 402 is used to match the local background color intensities to the global reference background color. This can be represented by the following Equation 2:

$$\tilde{c}_i = \frac{c_i}{\alpha_i}$$

Specifically, $\alpha_i$ represents a per-pixel scaling factor in Equation 2 for each of the i pixels in the original digital image of the paper document to match the local background color intensities to the global reference background color. In addition, $c_i$ represents the color intensities of the original digital image of the paper document, including the undesired artifacts such as shadow. Further, $\tilde{c}_i$ represents the de-shadowed output at pixel i respectively. The de-shadowed output resulting from the application of the per-pixel scaling factor to each of the pixels of the original digital image of the paper document is represented by instance 404 of FIG. 4.

Another example of a digital image of a paper document 406 is provided to illustrate. After determining local background colors and a global reference background color, a shadow map 408 is calculated, such as by using Equation 1. The shadow map 408 is then used to produce a de-shadowed output digital image of the paper document 410, such as by using Equation 2.

FIG. 4 provides two examples of paper documents that contain mostly, if not entirely, text-based graphics. In situations involving paper documents having graphics such as images and pictures, the techniques described herein are altered to allow for continued accurate removal of undesired artifacts. Images and pictures can be difficult to cluster in order to determine which color is the background color, and may be wrongly detected as shadow regions giving an incorrect intensity to the final output digital image. To resolve these issues, a user may define a mask to distinguish regions of digital images in order to omit these regions from calculation of the shadow map. In one or more implementations, interpolation is used to fill the hole left by the omitted regions in calculating the shadow map. For example, the system may employ natural neighbor interpolation by creating a Delauanay triangulation of the known pixels on the boundary of the mask and then filling in the missing pixels by weighting known vertices of the triangulation based on their distance. In this example, once the image regions are hole-filled and there are color intensity values for all pixels, the shadow map can be applied as before.

In yet another example, objects such as images can be automatically detected using an image classifier, allowing the entire process, including masking of pictures, to be executed automatically by a computing device. Alternatively or additionally, three clusters may be used instead of two clusters to cluster the color intensities of the histogram of the digital image, as described in the examples above. In this scenario, the third cluster represents the image intensities, which do not correspond to background or text regions of the original paper document, and are therefore disregarded in calculating the shadow map.

Figure 5:
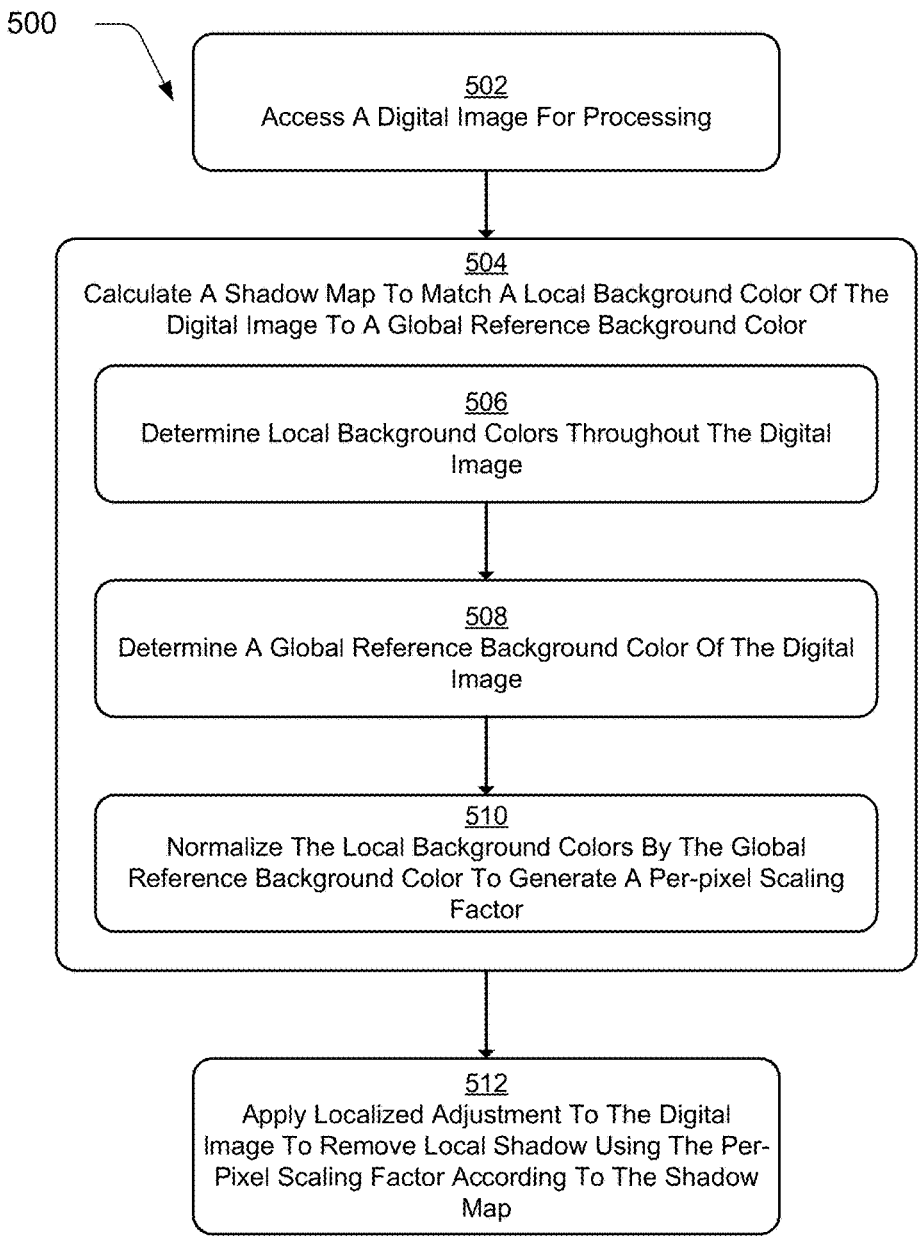
FIG. 5 is a flow diagram that describes details of an example procedure which includes calculating a shadow map to remove shadows from document images in accordance with one or more implementations.

Arriving now at FIG. 5, which depicts generally at 500 a flow diagram for an example procedure in which shadows are removed from document images using a shadow map. The procedure depicted in FIG. 5 can be implemented by way of a suitably configured computing device, such as by way of the image editing application 108 and the shadow removal module 110, and/or other functionality described in relation to the examples of FIGS. 1, 3, 4 and/or 6. Individual operations and details discussed in relation to FIG. 5 may also be combined in various ways with operations and details discussed herein in relation to the example procedure of FIG. 2.

A digital image, such as a digital image of a paper document, is accessed for processing (block 502), examples of which are provided above. Next, a shadow map is calculated to match local background colors of the digital image to a global reference background color (block 504). To calculate the shadow map, first local background colors are determined throughout the digital image (block 506). Local background colors can be determined by dividing the entire digital image into multiple local blocks. As discussed above, the local blocks may overlap one another. In one implementation, each of the local blocks may be 21×21 pixels, although any size blocks are contemplated. In order to accelerate processing of this step, a subset of pixels within the local blocks may be randomly sampled. In other words, color intensities are not determined for every pixel in every block. In the case where the local blocks are 21×21 pixels, for instance, 150 pixels within each respective block may be randomly sampled and color intensities of these 150 pixels determined. Alternatively or additionally, color intensities for each pixel within local blocks may be determined.

Further, in one or more implementations, local clustering may not be performed at each pixel. Instead, pixels are considered at specific strides (e.g., a stride of 20) for calculating local background intensities. A specific stride is a number of pixels that are omitted from a linear sample of pixels. For example, using a stride of 20, one pixel is considered, followed by 19 linearly adjoining pixels that are not considered, followed by 1 pixel that is considered, and so on. This results in a low resolution shadow map that is stride times smaller than the original digital image. Alternatively or additionally, local clustering may be performed at each pixel. Clustering may be performed in a variety of ways, such as by using a histogram of pixel intensities. For instance, for each local block, pixel intensities can be grouped into two clusters that can be labeled as background and text. Alternatively or additionally, three clusters may be formed, such as to accommodate pictures or images in the paper document. Three clusters may also be formed for documents generally having only background and text, where there is variation in intensity values of the text or the background and two clusters is not sufficient to capture accurate statistics. Any suitable number of clusters may be used to accurately represent the distribution of color intensities in the digital image of the paper document.

In addition to the techniques described above, GMMs corresponding to background color intensities are typically much narrower than for other regions such as text. Taking this into consideration, the global reference background color can be selected to correspond to the narrower of the two or more Gaussians that are fit to the color intensity data of each local block. This would provide for automatic computation of background colors in cases with paper documents having dark colored paper and bright text.

In implementations where less than all of the pixels in the local blocks are sampled, the local blocks of the low resolution shadow map can be upsampled by the block size, such as by using a Lanczos filter. This results in a full resolution shadow map of background colors of the combined local blocks. To reduce noise attributed to differences in cluster means, a median filter followed by a Gaussian filter can be applied to the full resolution shadow map. Upsampling provides the local background intensities at every pixel in the digital image of the paper document.

Next, a global reference background color is determined for the digital image (block 508). In one or more implementations, pixel intensities are taken from the entire input digital image, although implementations are also contemplated in which a region smaller than the entire digital image is used. Alternatively or additionally, a random sample of pixels throughout the digital image may be used (e.g., 1000 pixels), such as to accelerate processing times. Similar to the discussion above, pixel intensities are plotted on a histogram according to a color spectrum versus the number of pixels at each respective intensity. The pixel intensities are then clustered into multiple clusters, such as clusters representing text and background color intensities. Alternatively or additionally, more than these two clusters may be formed, such as to have two clusters for text when the color of the text in the paper document varies, or to have an additional cluster to account for pictures or images in the paper document. Any suitable number of clusters may be used to accurately represent the distribution of color intensities in the digital image of the paper document. Further, any suitable techniques for clustering the color intensities in the digital document may be used, such as by the techniques described above.

A cluster mean is determined for each of the multiple clusters representing the entire digital image. In one or more implementations, the cluster mean that has the higher value is labeled as the background. All of the intensities in the digital image are searched to find the closest color intensity to the cluster mean which has been labeled as the background. The color intensity that is the closest match is then labeled as the global reference background color. Alternatively or additionally, other techniques may be used to determine and label the background color intensity and the global reference background color. For example, the background cluster can be selected based on which is the narrower of two or more Gaussians that are fit to the color intensity data of the digital image.

In another example, the color intensity that occurs most frequently (e.g., the mode color intensity) in the digital image may be selected and labeled as the global reference background color. In yet another example, rather than using the clusters calculated of the entire digital image, the clusters calculated for the local blocks are used to determine the global reference background color. In particular, a percentile of the largest local background intensities of selected multiple local blocks of the digital image can be combined and labeled as the background. Then, an average color of the background color for these local blocks is labeled as the global reference background color. Other techniques of determining a global reference background color intensity for the digital image are also contemplated.

Subsequently, the local background colors are normalized by the global reference background color to generate a per-pixel scaling factor (block 510). This may be accomplished using Equation 1 above, which describes a ratio of a local background intensity at each pixel compared to the global reference background color intensity for the entire digital image. This ratio maps each input pixel of the digital image to the reference background color, generating the shadow map to complete block 504.

Finally, localized adjustment is applied to the digital image to remove local shadow using the per-pixel scaling factor according to the shadow map (block 512). Particularly, the per-pixel scaling factor is used to match each of the pixels of the original digital image to the global reference background color, such as by using Equation 2 above. Applying the shadow map to the original digital image using the per-pixel scaling factor produces an output digital image with undesired artifacts, such as shadow, removed from the digital image.

In one or more implementations, more than one shadow map may be calculated in order to remove undesired artifacts from digital images of paper documents, thus repeating one or more of blocks 504-510. For example, a shadow map is calculated first at a coarse resolution using a first set of local blocks on a first pass. Then, the digital image can be upsampled to a finer resolution using a second set of local blocks on a second pass, and the process is repeated until a desired resolution is reached. This can provide robustness to the removal of undesired artifacts, since it allows the local blocks to overlap different regions of the digital image. Local blocks that overlap different regions of the digital image can be beneficial because using a varying-sized footprint during clustering allows for a smoother and more accurate shadow map.

Having described example details and procedures associated with removing artifacts from document images, consider now a discussion of an example system that can include or make use of these details and procedures in accordance with one or more implementations.

Example Device

Figure 6:
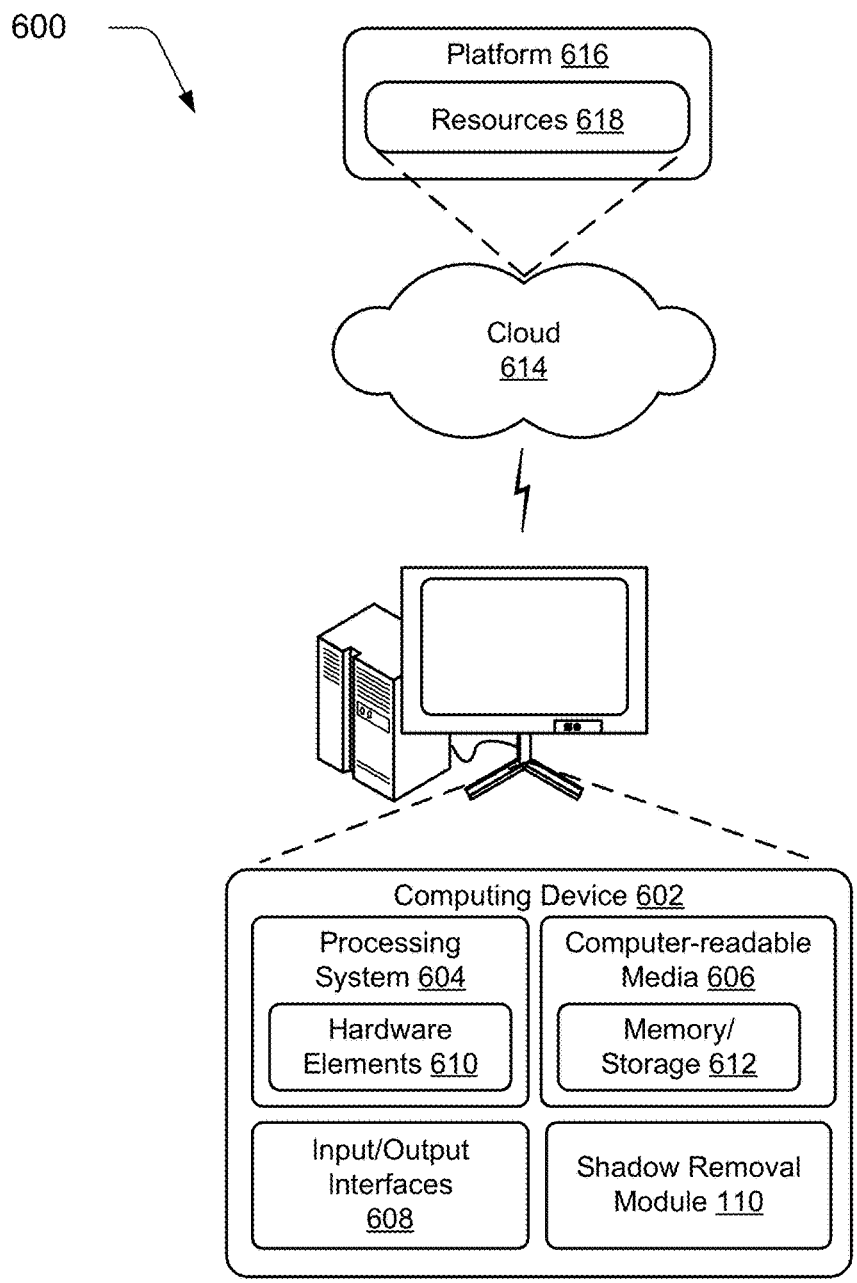
FIG. 6 is a block diagram of a system that can include or make use of a shadow removal module in accordance with one or more implementations.

FIG. 6 illustrates generally at 600 an example system that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the processing system 104, image editing application 108, shadow removal module 110, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system of FIG. 6, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer, mobile, and camera uses. Each of these configurations includes devices that may have generally different constructs and capabilities, and thus the computing device 602 may be configured according to one or more of the different device classes. For instance, the computing device 602 may be implemented as the computer class of a device that includes a personal computer, desktop computer, a multi-screen computer, laptop computer, netbook, and so on.

The computing device 602 may also be implemented as the mobile class of device that includes mobile devices, such as a mobile phone, portable music player, portable gaming device, a tablet computer, a multi-screen computer, and so on. The computing device 602 may also be implemented as the camera class of device that includes devices having or connected to a sensor and lens for capturing visual images. These devices include compact camera, action camera, bridge camera, mirrorless interchangeable-lens camera, modular camera, digital single-lens reflex (DSLR) camera, digital single-lens translucent (DSLT) camera, camcorder, professional video camera, panoramic video accessory, or webcam, and so on.

The techniques described herein may be supported by these various configurations of the computing device 602 and are not limited to the specific examples of the techniques described herein. This is illustrated through inclusion of the image editing application 108 and the shadow removal module 110 on the computing device 602. The functionality represented by the image editing application 108 and the shadow removal module 110 and other modules/applications may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system of FIG. 6. For example, the functionality may be implemented in part on the computing device 602 as well as via the platform 616 that abstracts the functionality of the cloud 614.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:

1. In a digital image editing environment, a method for removing artifacts from digital images, the method comprising:

accessing a digital image;
calculating a shadow map for the digital image, the calculating including:
   clustering pixel intensities of multiple blocks of the digital image into two or more clusters;
   determining local background colors for each of the multiple blocks of the digital image based on the two or more clusters of each of the multiple blocks;
   clustering pixel intensities representing the entire digital image into two or more clusters;
   determining global background colors for the digital image based on the two or more clusters representing the entire digital image;
   assigning a background color of the digital image as a global reference background color based at least in part on the determined global background colors; and
   generating a per-pixel scaling factor to normalize the local background colors by the global reference background color, the per-pixel scaling factor mapping the local background colors of the digital image to the global reference background color; and
applying localized adjustment to pixels of the digital image to remove artifacts from the digital image using the per-pixel scaling factor.

2. A method as described in claim 1, wherein the digital image is of a paper document.

3. A method as described in claim 1, wherein at least one of the clusters for each block of the digital image is based on text color intensities, and another cluster for each block of the digital image is based on background color intensities.

4. A method as described in claim 1, wherein the blocks of the digital image at least partially overlap one another.

5. A method as described in claim 1, wherein the determining of the local background colors for blocks of the digital image further comprises generating a histogram of color intensities within each respective said block.

6. A method as described in claim 5, wherein the histogram of color intensities is generated from a random sample of pixel color intensities from each respective said block.

7. A method as described in claim 5, wherein the histogram of color intensities is generated from pixel color intensities sampled at a specific stride within each respective said block.

8. A method as described in claim 1, wherein the clustering of the pixel intensities of the blocks includes using a Gaussian Mixture Model (GMM).

9. A method as described in claim 1, further comprising:
receiving a user input defining a mask of a region of the digital image;
omitting the region in calculating the shadow map; and
after calculating the shadow map, interpolating the shadow map to compensate for the masked region.

10. A method as described in claim 1, further comprising:
automatically detecting an object within the digital image;
omitting an area in the digital image encompassing the picture in calculating the shadow map; and
after calculating the shadow map, interpolating the shadow map to compensate for the area encompassing the picture.

11. A computing device comprising:
one or more processors; and
one or more computer-readable media having instructions stored thereon that, responsive to execution by the one or more processors, causes the one or more processors to implement a shadow removal module of an image editing application configured to perform operations comprising:

accessing a digital image;

dividing the digital image into multiple local blocks;

clustering pixel intensities of each of the local blocks into two or more clusters, the two or more clusters corresponding at least to a graphics color and a background color within each of the local blocks;

clustering pixel intensities of the entire digital image into two or more clusters corresponding to at least to a graphics color and a global background color of the digital image;

determining a global reference background color from color intensities in the cluster corresponding to the global background color of the digital image by comparing the color intensities to a representative background color;

generating a per-pixel scaling factor that maps pixels of the background colors in the local blocks to the global reference background color; and applying localized adjustment of color intensity to the pixels of the background colors in the local blocks to remove artifacts from the digital image using the per-pixel scaling factor.

12. A computing device as recited in claim 11, wherein the representative background color is a cluster mean of the global background color cluster of the digital image.

13. A computing device as recited in claim 11, wherein the representative background color is a most frequently occurring color intensity from the digital image.

14. A computing device as recited in claim 11, wherein the clustering pixel intensities of the multiple local blocks and the clustering pixel intensities of the entire digital image are performed using GMMs fit with Expectation-Maximization (EM) and initialized with k-means clustering.

15. A computing device as recited in claim 11, wherein the clustering pixel intensities of the multiple local blocks and the clustering pixel intensities of the entire digital image further comprise forming an additional cluster corresponding to another text color.

16. A computing device as recited in claim 11, wherein the background color within each of the local blocks and the global background color of the digital image correspond to clusters having higher color intensities than the text color within each of the local blocks and the text color of the entire digital image, respectively.

17. In a digital image editing environment, a method implemented by a computing device, the method comprising:

accessing, by the computing device, a digital image in an image editing application;

dividing, by the computing device, the digital image into multiple local blocks;

generating, by the computing device, histograms for each of the multiple local blocks, the histograms representing a sample of a number of pixels of particular color intensities in each of the multiple local blocks;

for each of the histograms of the multiple local blocks, using a Gaussian Mixture Model (GMM) by the computing device to cluster the histograms into two or more clusters;

determining, by the computing device, pixels of the digital image that make up background intensities by upsampling pixels from one of the clusters of each of the multiple local blocks;

generating, by the computing device, an aggregated histogram for multiple blocks of the digital image, the aggregated histogram representing a number of pixels of particular color intensities in all of the multiple blocks combined;

using, by the computing device, the GMM to cluster the aggregated histogram into two or more clusters;

determining, by the computing device, a global reference background color from the particular color intensities of the multiple blocks by comparing the each of the particular color intensities of the multiple blocks to a representative background color of the digital image;

generating, by the computing device, a shadow map that comprises a per-pixel scaling factor that maps the pixels of the digital image that make up background intensities to the global reference background color; and applying, by the computing device, localized adjustment to the pixels of the digital image that make up background intensities to remove artifacts from the digital image using the per-pixel scaling factor.

18. A method as recited in claim 17, wherein the multiple local blocks at least partially overlap one another.

19. A method as recited in claim 17, wherein the one cluster of each of the multiple local blocks used to determine background intensities is a cluster with a highest cluster mean amongst the two or more clusters for each of the respective multiple blocks.

20. A method as recited in claim 17, wherein the representative background color is a cluster mean of a cluster having highest color intensities amongst the two or more clusters of the aggregated histogram.

* * * * *